March 26, 1935.　　F. B. SECOR　　1,995,588

POWER OPERATED STEERING MECHANISM

Filed May 17, 1932　　3 Sheets-Sheet 1

INVENTOR.
Frank B. Secor,
BY Everett N Rook,
ATTORNEYS.

March 26, 1935.　　　F. B. SECOR　　　1,995,588

POWER OPERATED STEERING MECHANISM

Filed May 17, 1932　　　3 Sheets-Sheet 2

INVENTOR.
Frank B. Secor,
BY
ATTORNEYS.

March 26, 1935.  F. B. SECOR  1,995,588
POWER OPERATED STEERING MECHANISM
Filed May 17, 1932   3 Sheets-Sheet 3
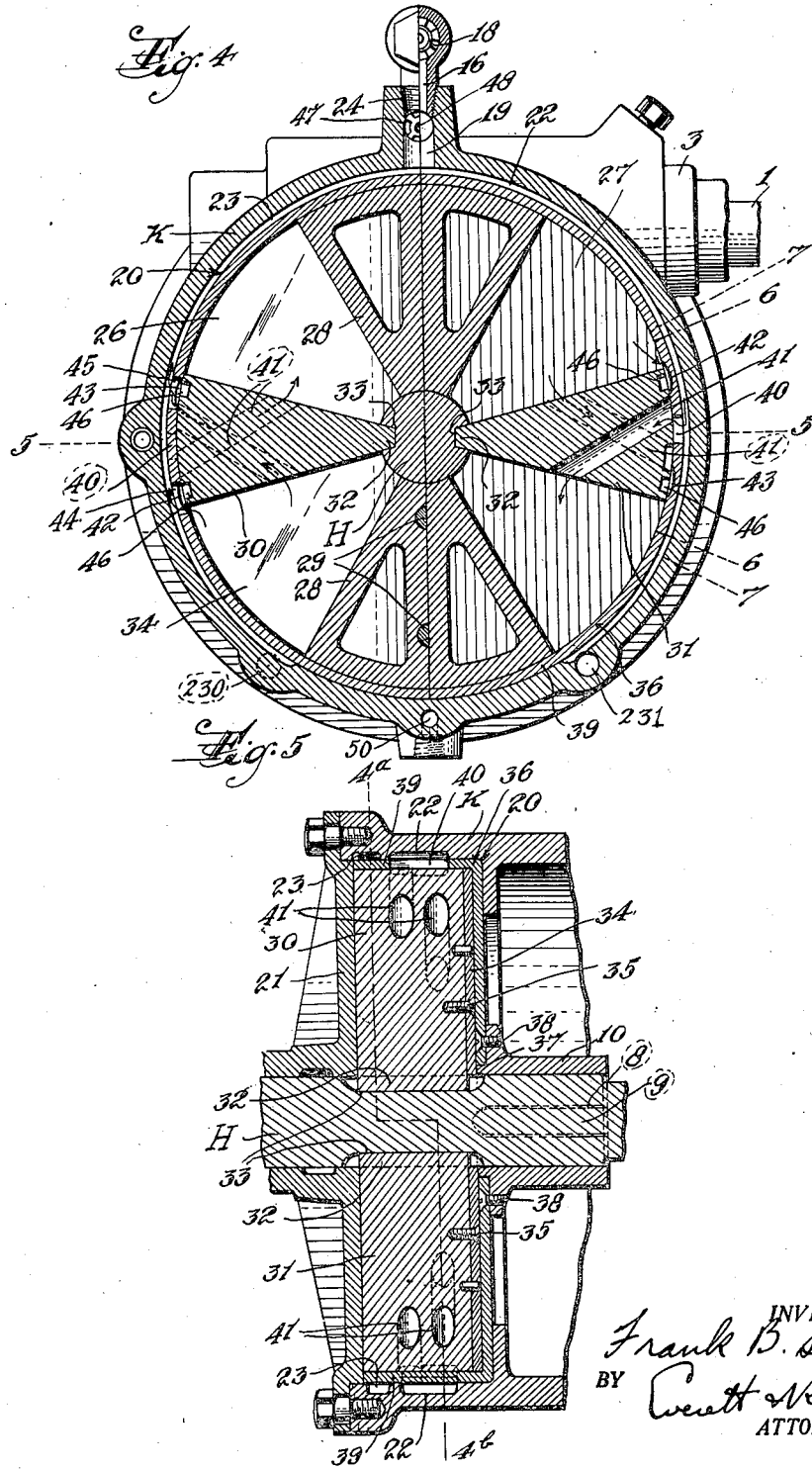

Patented Mar. 26, 1935

1,995,588

UNITED STATES PATENT OFFICE 1,995,588

POWER OPERATED STEERING MECHANISM

Frank B. Secor, Bloomfield, N. J.

Application May 17, 1932, Serial No. 611,775

3 Claims. (Cl. 180—79.2)

This invention relates in general to power operated steering mechanism and more particularly to a hydraulic steering gear for motor vehicles wherein the wheels of the vehicle are turned by power which is constantly under positive and accurate control of the operator of the vehicle by simple rotation of the steering wheel and with substantially only the manual effort necessary to rotate the steering wheel itself.

The development and rapidly increasing number of large, high power and high speed motor vehicles, the consequent crowded condition of the highways, the use of such vehicles for long distances, and the absolute necessity for quick and positive control of the vehicles to avoid accident, point to the requirement for powerful, positively and instantaneously operated steering mechanism which shall at the same time ensure absolute control of the direction of movement of the vehicles and relieve the operator of the fatigue incident to the manipulation of the known manually actuated steering mechanisms for long periods of time. Power operated steering mechanisms particularly hydraulically actuated gear, have been proposed, but their effectiveness has been limited by either the inadequacy of the power available from the engine of the vehicle and the consequent necessity for an additional power plant to operate the steering mechanism, or by complicated, unreliable construction. Some of these known power operated steering mechanisms have depended upon the regular oil pumping system of the vehicle engine, but this is not capable of supplying the required amount of power during prolonged periods sometimes necessary for turning the vehicle wheels while steering the vehicle and fails entirely when the pump is not operating. Other known power operated mechanisms have depended upon oil pumps in addition to the oil pumps in the regular engine oil systems. Most of the known power operated steering mechanisms are complicated, large, expensive and unreliable.

One object of my invention is to provide a power operated steering mechanism of the general character described embodying novel and improved features of construction which shall be positively and reliably operable by the usual oil system of a motor vehicle engine, and which shall be small, compact, simple and durable in construction.

Another object is to provide such a steering mechanism including an oil pressure accumulator wherein oil under pressure shall be stored so as to be instantly and constantly available for operating the steering mechanism, even when the oil pump is out of operation, for example when the vehicle engine is not running.

Other objects are to provide a fluid pressure operated steering mechanism of the character described embodying a novel and improved construction and combination of piston vanes, cylinders therefor, and a rotary sleeve valve mechanism wherein said piston vanes are directly connected to a driving shaft for turning the vehicle wheels, and the steering wheel shaft has a positive connection with said sleeve valve and a lost-motion connection with said driving shaft, whereby said sleeve valve can be actuated by said steering wheel relatively to said driving shaft and said driving shaft can be rotated directly by said steering wheel should occasion arise therefor, such as failure of the oil pressure; to provide novel and improved means whereby a continuous free circulation of oil through said motor and valve mechanism may be permitted during manual operation of said shaft by said steering wheel; and to obtain other advantages and results as will be brought out by the following description.

Referring to the accompanying drawings in which corresponding and like parts are designated throughout the several views by the same reference characters, Figure 1 is a top plan view of a power operated steering mechanism embodying my invention showing it applied to an automobile.

Figure 1:
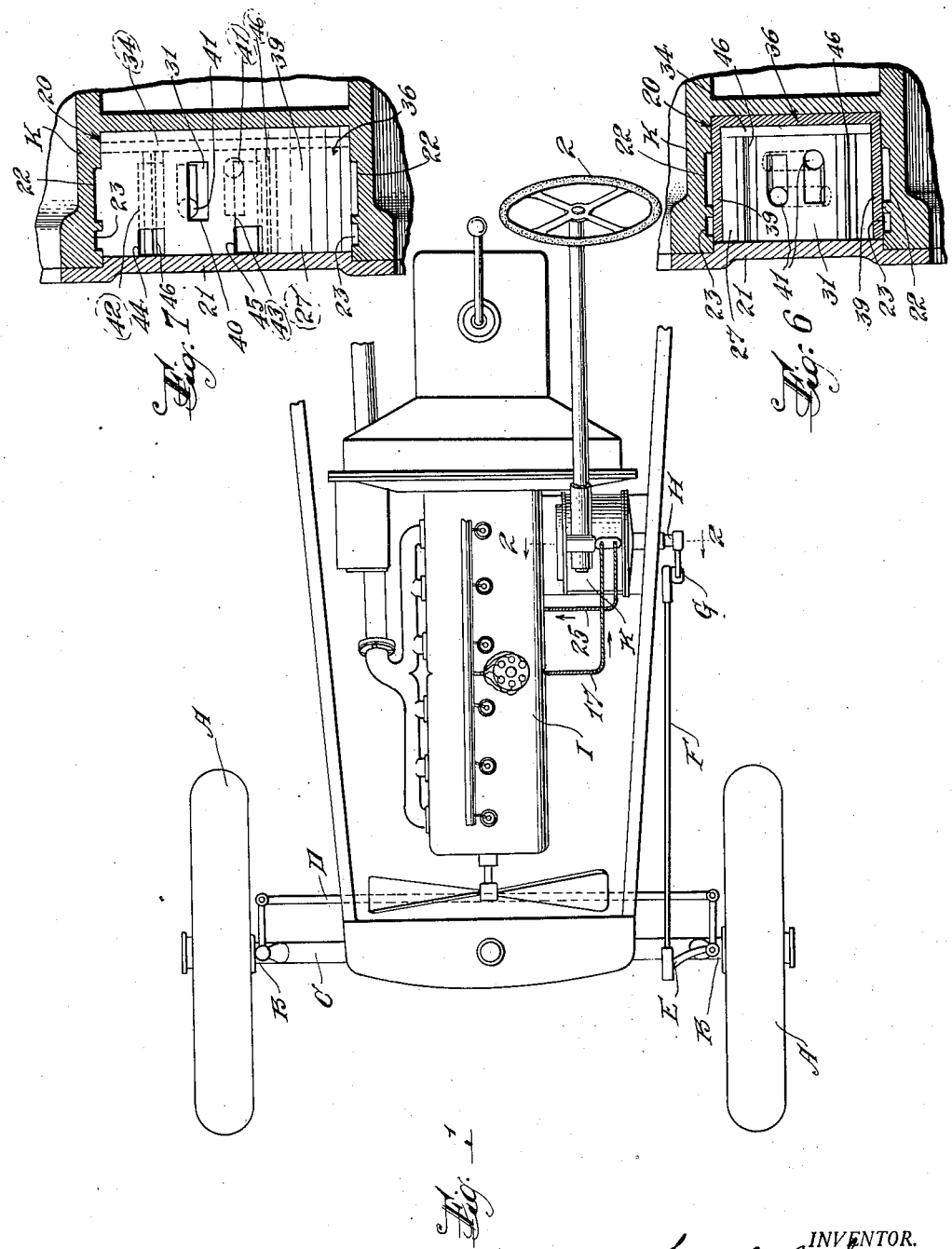
Figure 2:
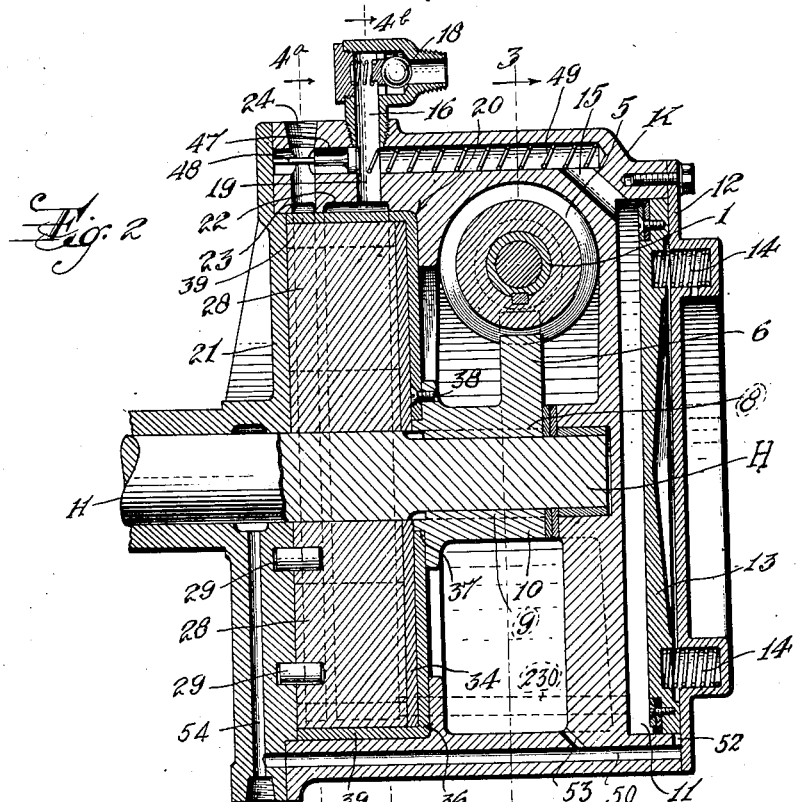
Figure 2 is a vertical longitudinal sectional view on the line 2—2 of Figure 1.

Figure 4 is a composite transverse vertical sectional view on the line 4a—4b of Figure 5, and lines 4a—4a and 4b—4b of Figure 2.

Figure 5 is a horizontal sectional view on the line 5—5 of Figure 4.

Figure 6 is a fragmentary sectional view taken on the line 6—6 of Figure 4 showing one of the piston vanes in end elevation and, Figure 7 is a similar view on the line 7—7 of Figure 4 showing the valve sleeve in elevation.

For the purpose of illustrating the principles of the invention I have shown it in connection with a known type of automobile steering apparatus which includes the front wheels A which are mounted on spindles B pivotally connected to the axle C in the usual manner. The spindles are connected by a tie rod D so as to cause simultaneous swinging of the wheels, and one of the spindles has connected thereto an arm E which is in turn connected by a pull rod F to a crank arm G on a drive shaft H which forms a part of my power operated mechanism. I have shown my invention in connection with the usual oil pumping system of an automobile engine I. The oil pumping system itself is not illustrated since it is well known and includes an oil pump, pipes and oil circulating passages through the engine.

Figure 3:
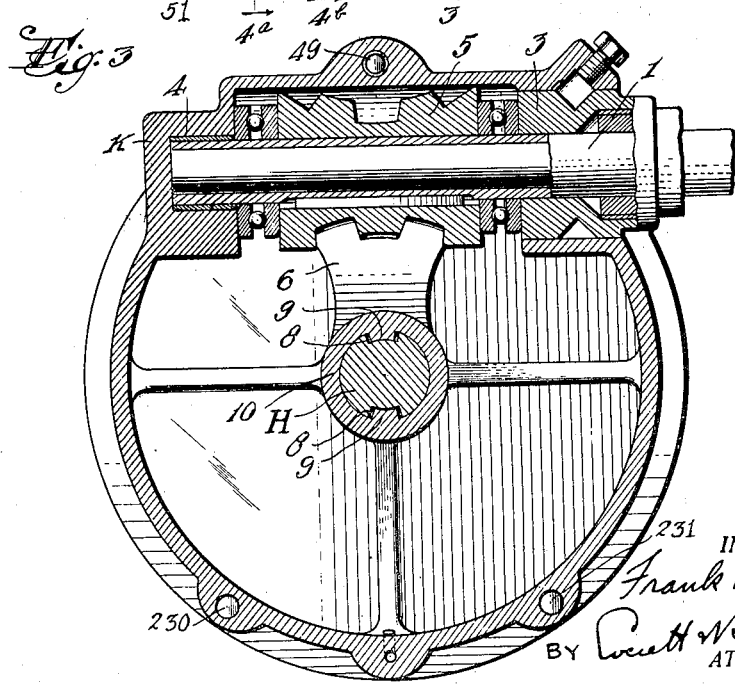
Figure 3 is a transverse vertical sectional view on the line 3—3 of Figure 2.

My invention comprises a main casing K which is approximately cylindrical and has journaled therein approximately tangentially thereto a steering shaft 1 to which is connected the usual steering wheel 2. As shown in Figure 3 of the drawings, the steering shaft 1 is journaled in bearings 3 and 4 and has a worm 5 keyed thereon within the casing. This worm meshes with a worm gear segment 6 which has a lost-motion connection with the driving or lay-shaft H which is journaled in the casing K substantially coaxially therewith and with its axis at approximately right angles to the plane of the axis of the steering shaft. This lost-motion connection comprises longitudinal grooves 8 in the shaft H in which are loosely arranged ribs or keys 9 carried by the hub 10 of the worm gear segment.

One end of the casing K has an interior chamber 11 which is closed by a cover 12 and has slidably mounted therein a disc piston 13 between which and the cover 12 are interposed compression springs 14. A passage or conduit 15 leads outwardly from the chamber 11 to a fluid supply passage 16 which is connected by a pipe 17 to the pressure or outlet side of the oil pumping system of the engine I. A spring check valve 18 is provided for preventing flow of fluid from the supply passage 16 backwardly into the pipe 17. The passage 16 also communicates with an inlet passage or conduit 19 for supplying fluid to a motor for actuating the shaft H.

The chamber 11 serves as an accumulator chamber for storing a large quantity of oil under pressure and for supplying this oil to the motor whenever the supply of oil directly from the pipe 17 is inadequate to properly operate the motor.

The end of the casing K opposite the chamber 11 has a substantially cylindrical motor chamber 20 which is closed at its outer end by a cover 21. The interior periphery of the motor chamber 20 has a circumferential inlet channel 22 which communicates with the inlet passage 19 and extends throughout the major portion of the inner circumference of the chamber 20. A second similar circumferential channel 23 is provided on the inner periphery of the motor chamber 20 and communicates with an outlet passage 24 which is connected by a pipe 25 to the oil sump or the return side of the oil pumping system. The inlet channel 22 communicates with the chamber 11 also through passages 230 and 231 to provide a maximum of flow of fluid to the inlet channel.

The motor chamber 20 is divided into two cylinders or compartments 26 and 27 by a pair of sector shaped blocks 28 which are rigidly secured to the cover 21 as by pins 29 and are disposed diametrically opposite about the shaft H as clearly shown in Figures 2 and 4 of the drawings. In these cylinders or compartments are arranged the respective piston vanes 30 and 31 which are rigidly connected to the shaft H by reduced end portions 32 on the vanes which are tightly fitted in longitudinal grooves 33 in the shaft. These piston vanes are also connected to each other and to the shaft H by a disc 34 to which the pistons are connected as by screws 35. The blocks 28 and the piston vanes 30 and 31 are enclosed between the cover 21 and a cup-shaped valve member 36 which is rotatable within the motor chamber 20 and has a nicely slidable engagement with the inner walls of the motor chamber, the ends of the pistons 30 and 31 and the ends of the blocks 28. The edges of the flanges 39 of the cup-shaped member abut the inner side of the cover 21, while the base of said valve member has a central opening 37 in which a portion of the hub 10 of the gear segment is fitted as clearly shown in Figures 2 and 5; and the valve member is rigidly secured to said hub 10 by screws 38. With this construction, it will be observed that the valve member 36 may rotate relatively to the piston vanes 30 and 31, and will be rotated through a gear segment 6 and worm 5 upon rotation of the steering shaft 1.

The flange 39 of the cup-shaped member serves as a valve sleeve, and in conjunction with the piston vanes 30 and 31 controls the flow of oil into the cylinders 26 and 27 from the inlet channel 22, and from said cylinders into the outlet channel 23. In juxtaposition to the end of each piston vane, the flange 39 is formed with an inlet slot 40 communicating with the inlet channel 22 and each piston vane is provided with a pair of ports 41 each of which opens through the outer end of the respective piston vane and one of which leads through each side of the piston vane, as clearly shown in Figure 4. The inner periphery of the flange or valve sleeve 39 is also formed with outlet grooves 42 and 43 which communicate with openings 44 and 45 at the free edge of the sleeve which in turn communicate with the outlet channel 23. Normally the inlet slots 40 and the outlet grooves 42 and 43 are closed by the ends of the corresponding piston vanes 30 and 31, and the inlet slot 40 and outlet grooves 42 and 43 for each piston vane are opened upon slight rotation of the valve sleeve relative to the piston vanes so as to admit oil from the inlet to one side of each piston vane and permit outflow of oil from the other side of each piston vane into the outlet. For example, upon rotation of the valve sleeve from its normal position in a counter-clockwise direction into the position shown in Figure 4 of the drawings the oil may flow through the inlet ports 40, one of the piston passages 41 into the corresponding chamber 26 or 27 at one side of the respective piston. At the same time oil may flow outwardly from the other side of said piston past the edge thereof through the outlet groove 42 into the circumferential outlet channel 23. Also oil may flow from the last-mentioned side of each piston through the other piston passage 41, the other outlet groove 43, into the circumferential outlet channel 23. The direction of flow of the oil is indicated by the arrows in Figure 4. As the oil flows into the cylinders 26 and 27, the pistons 30 and 31 are forced in the same direction in which the valve sleeve had previously been actuated, so as to rotate the shaft H, and such movement of the pistons will continue until the movement of the valve sleeve is stopped. Upon stopping of the valve sleeve the pistons move relatively thereto so as to close all of the ports and interrupt the flow of oil, whereupon movement of the pistons is stopped. Obviously upon initial movement of the valve sleeve in the opposite direction a similar operation will take place with movement of the pistons 30 and 31 in the opposite direction resulting.

From the foregoing it will be understood that for steering the automobile, it is merely necessary for the operator to rotate the steering wheel 2 in the desired direction and that upon such rotation of the steering wheel the valve sleeve is operated to start movement of the piston vanes 30 and 31 which in turn drive the shaft H and through the crank G, link F, arm E and steering spindles turn the wheels A in the proper direction. The shaft H will be driven by the pistons 30 and 31 so long as the steering wheel is turning, and the shaft H will stop as soon as the rotation of the steering wheel is stopped. The only manual effort required is that necessary to rotate the steering wheel 2 itself, but the steering mechanism is constantly under positive control of the operator.

Should the oil pressure from the supply pipe 18 become too low, or even cut off entirely, as by stopping of the oil pump, operation of the steering mechanism may continue through the supply of oil from the accumulator chamber 11. Accordingly, this accumulator chamber constantly supplements the pressure of the oil supplied directly from the pump, for example during prolonged periods of operation of the steering mechanism, as when making wide turns, and the accumulator chamber may entirely supply the oil necessary for operating the steering mechanism while the oil pump is out of operation for any reason.

It will also be observed that the pistons 30 and 31 themselves form a part of the valve mechanism and that this valve mechanism is extremely sensitive and quick and positive in operation. To provide a larger passage for the flow of oil from the cylinders 26 and 27, the pistons may be provided with grooves 46 to supplement the volume of the grooves 42 and 43 in the valve sleeve.

The invention also contemplates the manual steering of the automobile if desired. This manual operation is accomplished by the connection of the worm 5 through the gear segment 6 to the shaft H. After the lost motion between the gear segment and the shaft H has been taken up, further rotation of the steering shaft will result in driving of the shaft H directly from the steering shaft. This arrangement is particularly advantageous where the oil pressure fails or where the power mechanism is for some reason inoperative. Inasmuch as the cylinders 26 and 27 and the passages and ports leading to and from said cylinders are constantly filled with oil, it is necessary to provide some means for free circulation of the oil during manual operation of the steering mechanism to prevent back pressure. This means consists of a passage 47 between the outlet passage 24 and the inlet passage 19 which is controlled by a check valve 48. During manual operation of the mechanism, movement of the steering wheel opens the inlet and outlet ports as shown in Figure 4 of the drawings. At the same time pressure is created on the outlet side in passage 24 while suction is created on the inlet side in passage 19. The pressure on the outlet side will open the check valve 48 and permit the outlet oil to flow into the inlet passage so that there may be a continuous free circulation of oil as the pistons are moved manually. The check valve 48 is normally held closed by the inlet pressure in supply passage 16 and by a compression spring 49.

During operation of the mechanism, some leakage of oil is certain to occur. To care for this leakage I have provided a drain passage 50 which leads to a drain opening 51 which in turn may be connected to the oil sump. Passages 52, 53 and 54 are also provided to conduct leakage to said drain passage from behind the disk piston 13 in chamber 11, from the bottom of the motor chamber and from the bearing of shaft H in front of the motor chamber.

While I have shown and described the invention as embodied in certain details of construction it should be understood that this is primarily for illustrating the principles of the invention and that many modifications and changes may be made in the details of construction without departing from the spirit or scope of the invention.

Having thus described my invention, what I claim is:

1. In a power actuated steering mechanism the combination with a steering shaft and a driving shaft to be connected to steering apparatus, of a fluid pressure motor connected to said driving shaft, having an inlet and an outlet, means for supplying fluid under pressure, an accumulator chamber to store fluid under pressure from said supply means and communicating with said inlet, valve means for controlling flow of fluid from said accumulator chamber through said inlet and from said outlet, and an operative connection between said valve means and said steering shaft for actuating the valve means.

2. In a power actuated steering mechanism the combination with a steering shaft and a driving shaft to be connected to steering apparatus, of a fluid pressure motor connected to said driving shaft, having an inlet and an outlet, means for supplying fluid under pressure, an accumulator chamber to store fluid under pressure from said supply means, a conduit for supplying fluid direct from said supply means to said inlet, a common conduit for leading fluid from said supply means to said accumulator chamber and from said accumulator chamber to said inlet, valve means for controlling flow of fluid through said inlet to said motor and from said outlet, and an operative connection between said valve means and said steering shaft for actuating the valve means.

3. In a power actuated steering mechanism, the combination with a steering shaft, of a motor including a cylinder, a driving shaft to be connected to steering apparatus, and a piston in said cylinder connected to said driving shaft, means for supplying a fluid under pressure, an accumulator chamber for storing said fluid from said supply means, a check valve for preventing flow of fluid from said accumulator chamber to said supply means, valve means for controlling flow of fluid from said accumulator chamber to and from said motor cylinder, and an operative connection between said valve means and said steering shaft for actuating said valve means.

FRANK B. SECOR.